Nov. 27, 1951  M. SCHWARTZ ET AL  2,576,811
LOCKING OR CONTROL MEANS FOR THE SLIDE OF A PLATE
OR FILM HOLDER FOR PHOTOGRAPHIC APPARATUS
Filed Dec. 10, 1947  5 Sheets-Sheet 1

INVENTORS
MORRIS SCHWARTZ
WILLIAM CASTEDELLO
BY Frederick L. Harry
ATTORNEY Nov. 27, 1951  M. SCHWARTZ ET AL  2,576,811
LOCKING OR CONTROL MEANS FOR THE SLIDE OF A PLATE
OR FILM HOLDER FOR PHOTOGRAPHIC APPARATUS
Filed Dec. 10, 1947  5 Sheets-Sheet 2

INVENTORS
MORRIS SCHWARTZ
WILLIAM CASTEDELLO
BY
ATTORNEY

Nov. 27, 1951 M. SCHWARTZ ET AL 2,576,811
LOCKING OR CONTROL MEANS FOR THE SLIDE OF A PLATE
OR FILM HOLDER FOR PHOTOGRAPHIC APPARATUS
Filed Dec. 10, 1947 5 Sheets-Sheet 3

INVENTORS
MORRIS SCHWARTZ
WILLIAM CASTEDELLO
BY
ATTORNEY

Patented Nov. 27, 1951

2,576,811

UNITED STATES PATENT OFFICE 2,576,811

LOCKING OR CONTROL MEANS FOR THE SLIDE OF A PLATE OR FILM HOLDER FOR PHOTOGRAPHIC APPARATUS

Morris Schwartz and William Castedello, Stamford, Conn., assignors to The Kalart Company Inc., Stamford, Conn.

Application December 10, 1947, Serial No. 790,784

11 Claims. (Cl. 95—71)

This invention relates to plate and film holders as are used in connection with various types of photographic apparatus such as cameras, enlargers, etc.

Plate or film holders of the general type, above referred to, comprise a frame or casing which contains a septum supporting plates or films. Each plate or film is normally covered by a slide which is removed for the purpose of exposure and then restored. In photographic practice, it is customary to mark one side of a slide differently from the other to indicate whether the plate or film covered by a slide is exposed or unexposed; generally a silvered or whitened portion of the slide indicates an unexposed plate or film while a blackened portion is indicative of an exposed plate or film. According to the practice common in photography, the operator reverses the slide after having made an exposure, thereby placing the blackened slide portion in the position facing the outside.

Various means and devices have been proposed to lock an inserted slide in its position to avoid a fogging of a plate or film by accidental withdrawal of a slide and to enforce a reversal of a slide after an exposure to eliminate the danger of double exposure. However, the means and devices, as hitherto known, require manipulations by the operator which are either inconvenient and may be forgotten or are not completely reliable.

One object of the invention is to provide a novel and improved plate or film holder in which the sensitized layer or layers are protected against accidental exposure or double exposure by careless or improper handling of the holder without requiring special manipulation of the holder to attain such protection.

Another object of the invention is to provide a plate or film holder which is foolproof for all practical purposes in that it is virtually impossible for the operator to spoil a plate or film by double exposure or by accidentally withdrawing a slide, either partly or completely, before or after exposure.

A more specific object of the invention is to provide a film or plate holder the slide of which is automatically locked after the holder is loaded in the dark room and is automatically unlocked for withdrawal when the plate or film holder is inserted in the photographic apparatus.

Another more specific object of the invention is to provide a film holder which prevents a reinsertion of a slide after withdrawal of the slide for the purpose of exposure unless the slide is reversed.

Another object of the invention allied with the previously mentioned one is to provide plate or film holder which permits a reinsertion of a slide at will, after withdrawal for the purpose of exposure, without reversing the slide by manipulation of the plate or film holder. Such an arrangement has the advantage that the slide can be restored into its position showing its silvered portion at the outside in case the operator decides against taking a picture after having withdrawn the slide preparatory to taking a picture.

Another more specific object of the invention is to provide a plate or film holder, the slide of which is automatically locked after being reinserted in reversed position after an exposure and is automatically unlocked by withdrawing the septum of the holder which is normally done in the dark room. Such an arrangement has the advantage that it prevents an accidental withdrawal of the slide after an exposure.

Another more specific object of the invention is to provide a plate or film holder the septum of which is automatically locked in the holder casing after being inserted and can be conveniently released for removal of the plates or films.

Another object of the invention is to provide a novel and improved light trap for a plate or film holder which trap can be manufactured in a simple and inexpensive manner and affords a high degree of light tightness when the slide is removed from the holder.

Another object of the invention is to provide a novel and improved plate or film holder, either of the simplex type or the duplex type, in which a slide is automatically locked in its position indicative of an unexposed sensitized layer, is automatically unlocked upon insertion of the holder in the camera, can be reinserted in the holder, without manipulation, only after reversal following an exposure, is automatically relocked in its reversed position, and is automatically unlocked by the removal of the septum. Furthermore, the septum is automatically locked upon insertion and can be conveniently unlocked for purpose of removal.

The invention is applicable to and useful for plate and film holders, either of the simplex or the duplex type.

Other and further objects, features and advantages of the invention will appear hereinafter and be pointed out in the claims forming part of the application.

Certain features and elements of plate and film holders and of magazines for pack film or roll film that are disclosed in the present application but are not made the subject matter of claims, are claimed in the copending application of Ser. No. 1,116 filed on January 8, 1948, by Morris Schwartz and William Castedello.

In the accompanying drawings several now preferred embodiments of the invention are shown by way of illustration and not by way of limitation.

In the drawings:

Figs. 9 and 10 are detail views, partly in section, showing the locking elements for locking the slide after reversal of the slide following an exposure; Fig. 9 illustrating the slide locked by the septum, Fig. 10 illustrating the slide unlocked after withdrawal of the septum.

Figure 1:
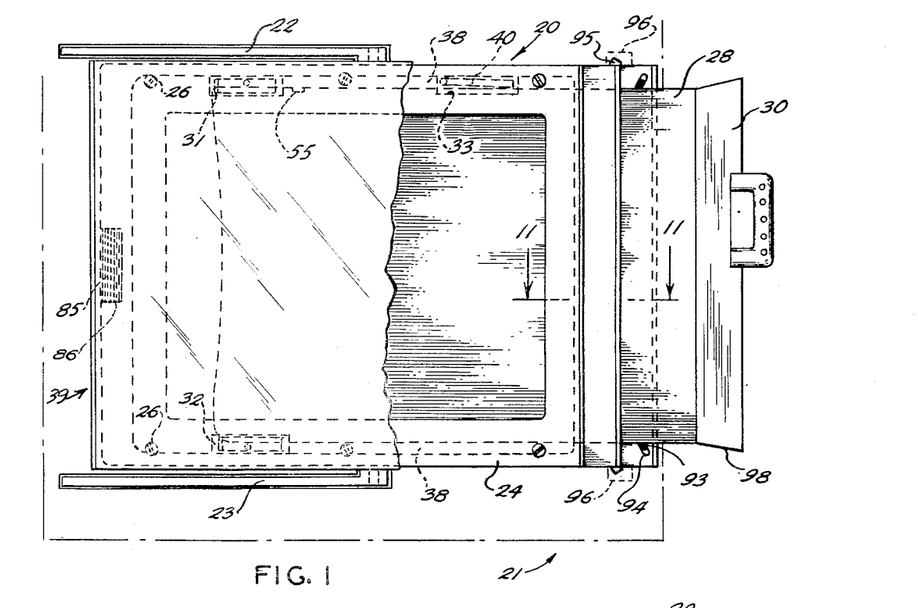
Fig. 1 is a plan view of a plate or film holder according to the invention inserted in a camera.

Referring now to the figures in detail:

Fig. 1 shows a plate or film holder of the duplex type, generally designated by 20, inserted in a photographic apparatus such as a camera, generally designated by 21, the outline of the camera being indicated by dotted lines. The camera is shown as being of the so-called "News or Press" type equipped with a spring back 39 and spring loaded arms 22 and 23. The back 39 is broken off to show the plate or film holder.

Figure 2:
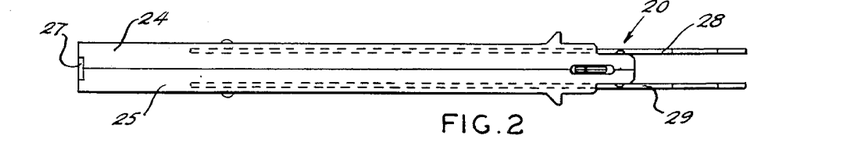
Fig. 2 is a side view of the plate or film holder according to Fig. 1.

As can be seen on Fig. 2, the casing of the holder is composed of two sections 24 and 25 respectively joined together by screws 26 or any other suitable means. The casing is arranged to receive a septum 27 supporting on each side a plate or film in a conventional manner. One of the sensitized layers is normally covered by a slide 28 and the other by a slide 29. The end portions 30 of each slide are marked differently on each side to indicate whether a plate or film covered by a slide is exposed or not. Conventionally, the end portion facing the outside when the respective sensitized layer is unexposed is silvered or whitened and the opposite side is blackened. Slide 28 in Fig. 1 is assumed to cover an unexposed sensitized layer.

In the subsequent description, the arrangement and function of the plate or film holder will be described for one half of the holder as a matter of convenience but it should be understood that the second half of the holder is a duplication of the described half.

Figure 3:
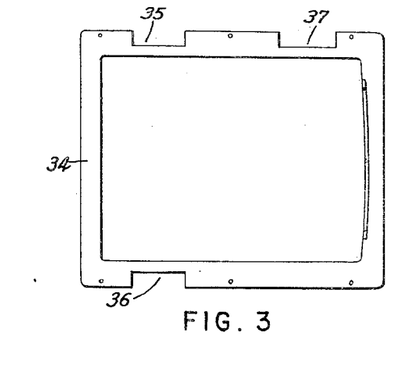
Fig. 3 is a plan view of one of the component parts of the plate or film holder.
Figure 4:
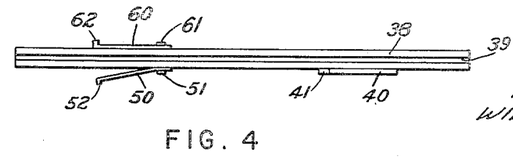
Fig. 4 is a side view of another component part of a plate or film holder.

Casing section 24 is provided with three recesses 31, 32 and 33. Adjoining thereto but leaving sufficient clearance for the passage of slider 28 is a frame 34 the shape of which can best be seen on Fig. 3. The frame is also provided with three recesses 35, 36, and 37 corresponding to the recesses 31, 32, and 33. Adjacent to frame 34, there is inserted in casing 24 a bar 38 along each of the long sides of casing sections 24 and 25. Each of these bars is provided with an axial groove 39 in which septum 27 is guided. Similarly, the second half of the holder comprises a frame such as 34, bars 38 being common to both halves of the holder.

*Means for enforcing reversal of a slide after exposure*

The means for enforcing reversal of a slide are partly provided at the holder proper and partly at the slide.

Figure 5:
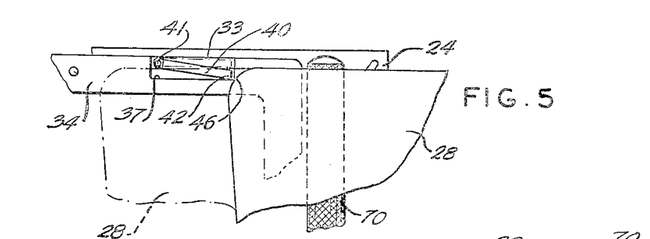
Fig. 5 shows a plan view of the locking elements of the holder which serve to enforce a reversal of the slide after exposure, the slide being shown in the correct position after an exposure.
Figure 6:
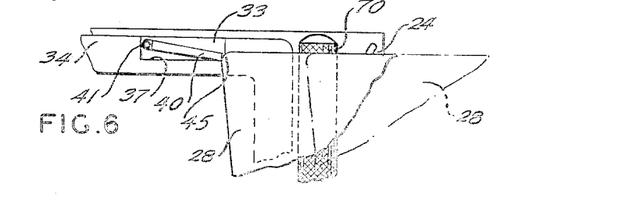
Fig. 6 is a view similar to Fig. 5, showing the blocking of an attempted insertion of the slide by the locking elements without reversal of the slide.

The means on the holder comprises a lever or arm 40 fastened to bar 38 and positioned within aligned recesses 33 and 37 as can best be seen on Figs. 5 and 6. Arm 40 is pivoted to bar 38 by a pivot 41 so that it can freely pivot within the recesses. The depth of the recesses is so selected that the edge 42 of arm 40 can pivot into the path of a slide 28 inserted between frame 34 and the respective wall of frame section 24. The cross section of the arm is so designed that the edge 42 of the arm will protrude above the plane of frame 34. In other words, arm 40 will block slide 28 in certain positions of the arm.

Slide 28 has a substantially pointed edge 45 and a well rounded edge 46.

The operation of the means for enforcing reversal of the slide after exposure is as follows:

Let it be assumed that the holder has been loaded in the darkroom and that it is now desired to insert slide 28. For this purpose, the holder is held in a position in which arm 40 is at the lower edge of the holder so that the freely pivotal arm drops into a position in which the path for the slide is clear. The slide can now be inserted with the pointed edge 45 adjacent to the arm. The holder is now ready for insertion in the camera.

When the slide is properly reversed, after withdrawing the slide and making an exposure, and reinserted, the rounded edge 46 engages arm 40 and turns the same back so that the slide can be pushed home. If, however, the operator forgets to reverse the slide the pointed edge 45 will engage arm 40 so that insertion of the slide beyond the position of arm 40 is blocked.

In certain instances, the operator may decide against taking a picture after withdrawing the slide and hence wishes to reinsert the slide with the marking indicating an unexposed plate or film at the outside. This can be conveniently accomplished by turning the camera, while the holder is still inserted in the camera, into such position that arm 40 will drop out of the path of the slide by its own weight thereby permitting an insertion of the slide with the unexposure marking at the outside.

*Means for preventing a fogging of the sensitized layer by accidental partial or complete removal of the slide*

The means for preventing fogging of the plate or film by accidental partial or complete removal of the slide are designed to protect the plate or film whether the slide is in a position indicating non-exposure or exposure. Certain components of these means are provided on the holder proper while others are on the slide itself.

Figure 7:
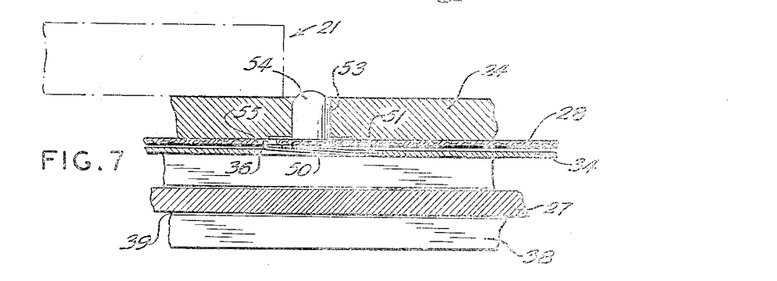
Fig. 7 is a detail view, partly in section, showing the automatic locking of a slide after inserting the same into the plate or film holder.
Figure 8:
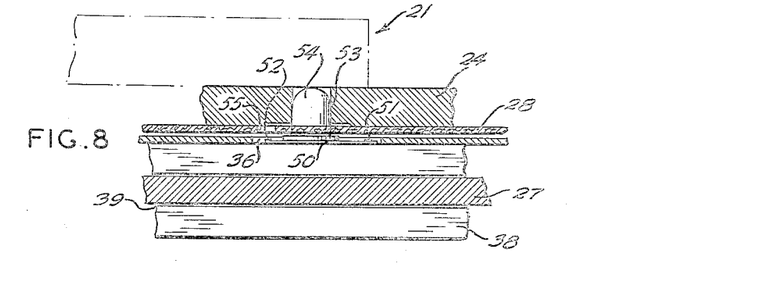
Fig. 8 is a view similar to Fig. 7 showing the automatic unlocking of the slide after insertion of the holder in the camera.

The means for preventing fogging of the plate or film when the slide covers an unexposed sensitized layer are best shown in Figs. 7 and 8. They comprise a leaf spring 50 fastened at one end by any suitable means such as a rivet 51 to bar 38 and bent off at the free end to form a nose 52. Spring 50 is positioned within recess 36 of frame 34 and slightly bent upward so that it extends into the clearance left between frame 34 and holder section 24 for insertion of slide 28. The widths of recess 36 and spring 50 are so selected that the spring, particularly its nose 52, will extend into the path of slide 28 as can best be seen in Fig. 7. A hole 53 is provided in holder section 24 in which is inserted a shoulder pin 54. Hole 53 is positioned outside the path of the slide, as can best be seen in Fig. 7 so that spring 50 can engage pin 54 and bias the same into the position shown in Fig. 7 in which the pin protrudes from holder section 24. The slide 28 is provided at the side having pointed edge 45 with a notch 55 which is so positioned that nose 52 will engage notch 55 when the slide is pushed home.

The operation of the means for preventing fogging of a sensitized layer, as hereinbefore described, is as follows:

Let it be assumed that the plate or film holder is loaded and that slide 28 is inserted in the proper position. Nose 52 will then engage notch 55 of the slide thereby locking the slide and preventing an accidental partial or complete withdrawal of the slide. When the holder is now inserted into the camera, the frame of the camera back, indicated in Figs. 7 and 8 by phantom lines, will push shoulder pin 54 flush with frame section 24, as indicated in Fig. 8, thereby automatically unlocking the slide.

As will be noted, the top of pin 54 is rounded and protrudes only slightly from the frame casing so that there is no danger of an accidental release of slide 28 by the pressure for instance of a finger. It is of course possible to release the slide by intentionally depressing the pin.

Figure 9:
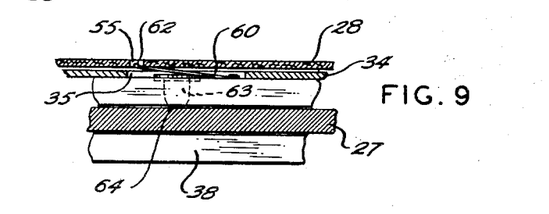
Figure 10:
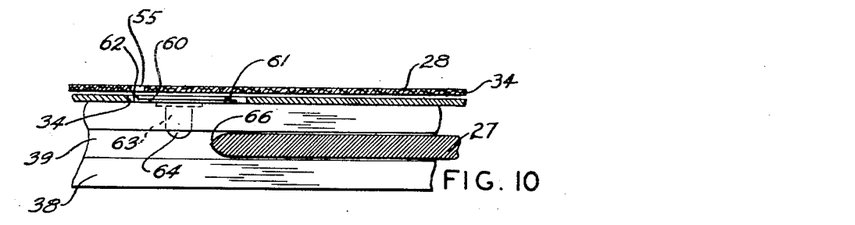

The means for preventing a fogging of the sensitized layer by accidental partial or complete withdrawal of the slide when the same is in a position indicative of an exposed plate or film are shown in detail in Figs. 9 and 10. According to these figures, a leaf spring 60 is fastened to bar 38 by any suitable means such as a rivet 61. The free end of spring 60 is slightly bent up to form a nose 62. The spring is positioned within recess 35 of frame 34 so that nose 62 extends into the path of slide 28 and so biased that it tends to assume a position substantially flush with frame 34. In other words, spring 34 tends to clear the path of the slide. A hole 63 is provided in bar 38 opening into groove 39 of bar 38. This hole serves to receive a shoulder pin 64, the rounded head of which extends into groove 39. Spring 60 urges the pin into the position shown in Fig. 10.

Septum 27 is designed to coact with pin 64 and is provided for this purpose with a tapered edge 66.

The operation of the locking or safety means as shown in Figs. 9 and 10 is as follows:

Let it be assumed that septum 27 is inserted in the holder, as shown in Fig. 9, then the septum presses pin 64 into a position in which the shoulder pin moves spring 60 into engagement with notch 55 of slide 28 so that the slide is locked. When the septum is withdrawn, usually in the dark room, pin 64 is released and spring 60 will snap back into its flush position as shown in Fig. 10. As a result, slide 28 is unlocked so that it can be withdrawn and reversed.

*Light trap for the slides*

Figure 11:
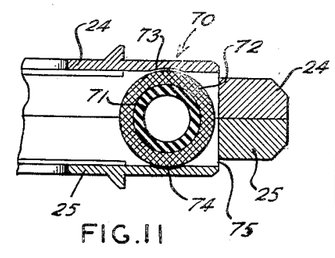
Fig. 11 is a sectional view along line 11—11 of Fig. 1 showing the light trap of the plate or film holder on an enlarged scale, the septum being removed.
Figure 12:
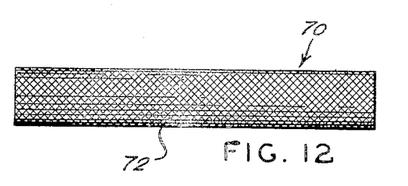
Fig. 12 shows part of the light trap removed from the holder.

A light trap according to the invention, as shown in Figs. 11 and 12, comprises a roll 70 of suitable length. This roll constitutes a core shown as a tube 71 made of rubber or other suitable flexible material and covered with a fabric 72 such as velvet. The roll extends across the width of the holder casing and is fitted into grooves 73 and 74 respectively provided in holder sections 24 and 25 respectively. As can best be seen on Fig. 11, the roll protrudes into the path of both slides so that a slide inserted in one of the slide slots 75 compresses the roll to a certain extent thereby securing light tightness.

Tests have shown that a very high degree of light tightness can be attained by the pile of fabric 72. The roll has the additional advantage that it can be simply and inexpensively manufactured and may not require any gluing operation.

*Means for automatically locking the septum*

Figure 13:
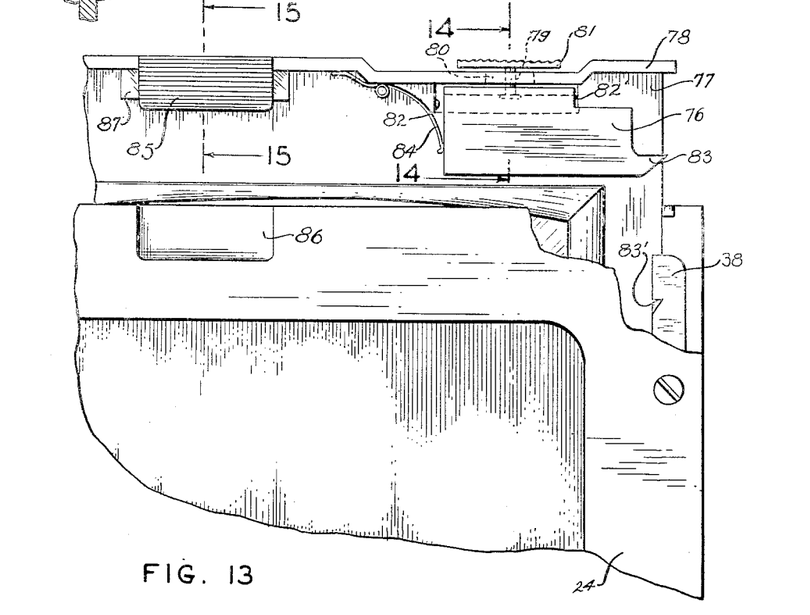
Fig. 13 is a fractional view of a plate holder the septum of which is provided with automatic locking means according to the invention.
Figure 14:
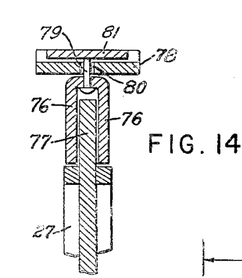
Fig. 14 is a section along line 14—14 of Fig. 13.
Figure 15:
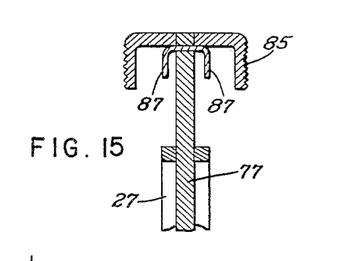
Fig. 15 is a section along line 15—15 of Fig. 13.

The septum locking means, as shown in Figs. 13, 14 and 15, comprise a U-shaped locking member 76, the two arms of the locking member straddling partition wall 77 of the septum. However, it is of course also possible to provide a locking member on one side of the septum wall only. The locking member is slidably supported by a flange 78 of the septum. For this purpose, a shoulder pin 79 fastened to the locking member, is passed through an elongated slot 80 in flange 78. The protruding end of the pin is secured to a preferably knurled plate 81 serving as grip. An elongated slot 82 in partition wall 77 permits transverse displacement of the locking member relative to wall 77. Each arm of the locking member is provided with a nose 83 which noses engage corresponding notches 83' in adjacent bar 38 when the septum is pushed home. A spring 84 fastened by any suitable means to wall 77 of flange 78 urges the locking member into engagement position, the sliding movement of the locking member as caused by spring 84 being limited by the forward edge 82' of slot 82. The edge of nose 83 facing the holder frame is slanted so that the locking member will be pressed back when the septum is pushed home thereby permitting an insertion of the septum without manipulating the septum locking means.

For the purpose of permitting a convenient operation of the locking means and gripping of the septum, a downwardly bent, preferably knurled extension 85 is provided at each side of septum wall 77. These extensions are received by corresponding recesses 86 in the holder casing so that the extensions are flush with the holder casing when the septum is inserted. Slightly springy flanges 87 are preferably provided between extensions 85 and septum wall 77 to secure a fixed position of the septum in the holder casing and also to serve as lighttrap.

*Means for locking an inserted plate or film holder to the back of a photographic apparatus*

Figure 16:
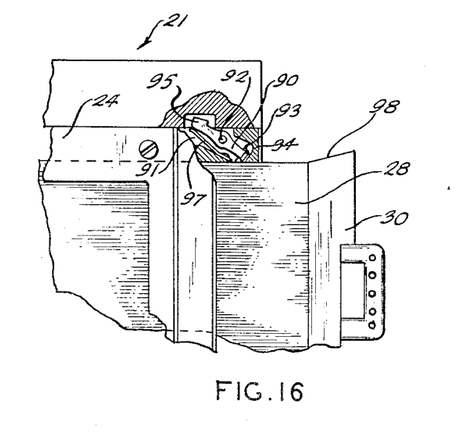
Fig. 16 shows a detail view, partly in section, of additional locking elements of the holder according to Fig. 1.
Figure 17:
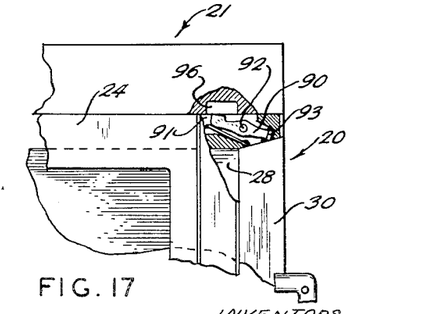
Fig. 17 shows a detail view of the same locking elements in a different position of the elements.

The means for locking an inserted plate or film holder to a camera, as best shown in Figs. 16 and 17, comprise a two-arm lever 90 pivotally disposed in a recess 91 of holder section 24 by means of a pivot 92. One arm of lever 90 is provided with a bent-off nose 93 which is extended through an elongated slot 94 in casing section 24. Slot 94 is shaped and positioned to permit a pivotal movement of lever 90 within recess 91. The other end of lever 90 is also provided with a nose 95 which engages a notch 96 in the frame of the camera back when the lever 90 is in the position shown in Fig. 16 and is withdrawn from the notch when the lever is in the position shown in Fig. 17. As can best be seen from Fig. 1, nose 95 is adjacent to notch 96 when the plate or film holder is fully inserted in a camera.

A spring 97 urges lever 90 into the engaging position shown in Fig. 16.

The locking means according to Figs. 16 and 17 are provided at opposite edges of the holder as can be seen in Fig. 1, one pair of locking means being associated with each half of the holder. The position of lever 90 is controlled by the position of the respective slide. For this purpose, the portion 30 of each slide is slanted at 98 so that slanted edges 98 will engage noses 93 when the slide is pushed home, and pivot lever 90 into a position in which the noses are withdrawn from notches 96 in the camera frame as shown in Fig. 17.

The operation of the holder locking means is as follows:

As previously mentioned, with photographic apparatus such as cameras of the type equipped with a spring back, the plate or film holder is inserted into the camera by being pushed between the spring back and the camera casing proper and is held in position by the pressure exerted by the spring arms 22 and 23 upon the spring back. Practical experience shows that in certain instances a plate or film is fogged by accidentally tilting the inserted holder together with the spring back away from the camera when a slide is partly or completely removed, for instance by pulling the slide back during removal or insertion or by accidentally pressing against the spring back. Another cause of fogging a film or plate is a removal of the holder from the camera without completely pushing home the slide. The holder locking means, as just described, eliminate these dangers of ruining a plate or film.

When the loaded plate or film holder is inserted into the camera, all noses 95 are withdrawn. When now the operator withdraws a slide, slide edges 98 become disengaged from the respective noses 93. As a result, springs 97 push noses 95 into notches 96 so that the holder is not only held by the pressure of the spring back but also positively and automatically locked to the camera casing. Hence, the holder cannot be tilted away from the camera casing even though the spring back may be tilted. Furthermore, the holder can be removed from the camera only when the slide is completely reinserted thereby automatically unlocking the holder by the coaction between slide edges 98 and levers 90.

Figure 18:
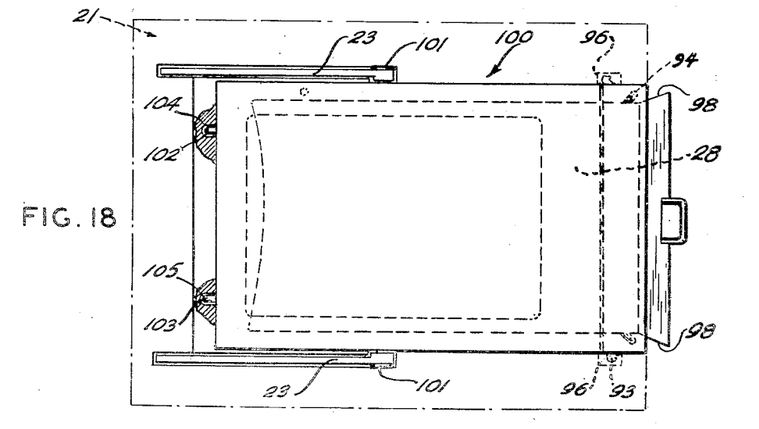
Fig. 18 shows a plan view of a magazine for pack film equipped with locking means according to the invention, the magazine being shown inserted into a photographic apparatus.
Figure 19:
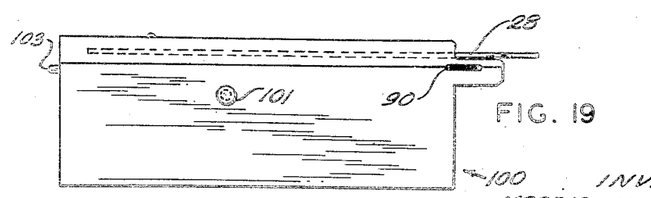
Fig. 19 is a side view of a magazine according to Fig. 18.

Figs. 18 and 19 show the application of the holder locking means as described in connection with Figs. 16 and 17, to a magazine for cut sheet film or plates, generally designated by 100. As is well known in the art, the thickness of magazines or adapters for film packs usually prevents an insertion between spring back and camera casing. It is therefore customary to remove the spring back and to slip spring arms 22 and 23 over corresponding noses 101 on the walls of the magazine. As will be apparent, the same danger of fogging one of the films in the magazine by tilting the magazine or by removing the magazine without completely pushing home the slide is present as was previously described for a plate or film holder. These dangers are eliminated by providing locking means as shown in Figs. 16 and 17 for the magizine so that the magazine is automatically locked to the camera when a slide is withdrawn and until the slide is completely reinserted.

It will be apparent from Fig. 18, the locking means lock the magazine to camera at the end at which the slide is inserted. This leaves the possibility of lifting the magazine away from the camera at the opposite end since this end of the magazine is not secured by a spring back as is a plate or film holder. To secure the second end of the magazine, pins 102 and 103 are provided on the rear wall of the magazine which engage corresponding holes 104 and 105 respectively in the camera frame when the magazine is inserted. The magazine is now positively secured by locks at both ends and also by the pressure of spring arms 22 and 23.

Figure 20:
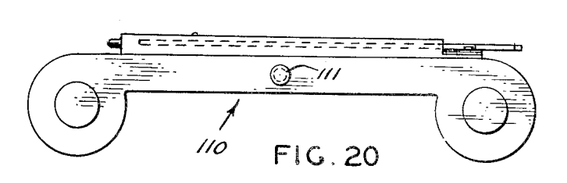
Fig. 20 is a side view of a magazine for roll film equipped with locking means according to the invention.
Figure 21:
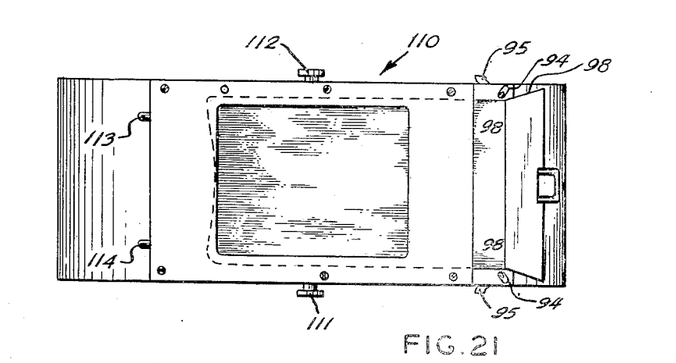
Fig. 21 is a plan view of the magazine according to Fig. 20.

Figs. 20 and 21 show the application of the locking means according to Figs. 16 and 17 to a roll film holder, generally designated by 110. Such holder is secured to the camera after removal of the spring back by hooking spring arms 22 and 23, over noses 111 and 112 on the magazine. As a result, the holder can be tilted away from the camera or removed without completely reinserting the slide, as has been described in connection with a plate or film holder and a cut film magazine.

According to the invention, the holder is positively secured to the camera casing by providing locking means as shown in Figs. 16 and 17 and holding pins 113 and 114 engaging corresponding holes 104 and 105 in the camera frame, thereby securing the film holder at both ends and pressing it against the camera in the middle.

While the invention has been described in detail with respect to certain now preferred example and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A plate or film holder of the type described, comprising in combination a casing having septum and slide guide tracks, a septum adapted to receive a sensitized layer and slidable in said septum guide tracks, at least one removable slide for covering and uncovering a sensitized layer supported by the septum and slidable in said slide guide tracks, first locking means including a movable locking member supported on one of the sides of the casing and arranged to extend into the path of the slide in said slide guide tracks and to be engaged by one of the slide covers for blocking, after withdrawal of the slide in a predetermined slide face position, a re-insertion of the slide in the same slide face position and to be moved by the opposite corner of the slide out of the path of the slide when the latter is reinserted in reversed slide face position; second locking means including a locking member supported on one of the sides of the casing and extending into one of said guide tracks, said locking member engaging a notch in the edge portion of the slide extending into the respective slide guide track when the slide is inserted in said predetermined slide face position for locking the slide in the said position; release means supported on the casing protruding from the face thereof and engageable with said second locking member for moving the said member out of said notch and into a release position; third locking means including a locking member supported on the casing and arranged to engage a second slide notch in the edge portion thereof extending into the slide guide tracks when the slide is reinserted in reversed slide face position for locking the slide in the latter position; and second release means supported on the casing and engageable with the third locking means, said second release means being controlled by the position of the septum in the septum guide tracks and arranged to move the third locking member out of said second slide notch and into a release position in response to a withdrawal of the septum.

2. A plate or film holder as described in claim 1 wherein said second locking means comprise a yieldable locking member disposed within the holder casing and biased to engage said first slide notch upon insertion of the slide while being in said predetermined slide face position thereby locking the slide, and wherein the respective release means comprise an element movably mounted on the casing and positioned to engage the locking member for moving the same into a position disengaged from the notch thereby releasing the slide for withdrawal.

3. A plate or film holder as described in claim 1 wherein said second locking means comprise a yieldable locking member disposed within the holder casing and biased to engage said first slide notch upon insertion of the slide while being in said predetermined slide face position thereby locking the slide, and wherein the respective release means comprise a pin slidably mounted in the casing, one end of the pin engaging said locking member, the other end protruding from a face side of the casing for releasing the slide in response to a depression of the pin causing disengagement of the locking member from said notch thereby releasing the slide for withdrawal.

4. A plate or film holder as described in claim 3, wherein the protruding end of the pin is positioned to be engaged and depressed by the back of a camera into which the holder is inserted.

5. A plate or film holder as described in claim 1, wherein said third locking means comprise a yieldable locking member disposed within the casing adjacent to the path of the slide in said slide guide tracks and positioned to engage said second slide notch upon complete insertion of the slide while being in said reversed slide face position, and wherein the respective release means comprise an element movably mounted on the casing in engagement with the said locking member and positioned to be engaged by the septum for moving the said locking member into engagement with said notch upon insertion of the septum in said septum guide tracks.

6. A plate or film holder as described in claim 1, wherein said third locking means comprise a yieldable locking member disposed within the casing adjacent to the path of the slide in said slide guide tracks and positioned to engage said second slide notch upon complete insertion of the slide while being in said reversed slide face position, and wherein the respective release means comprise a control element movably mounted in the casing, one end of said element engaging the said locking member, the other end protruding into the path of the septum in said septum guide tracks, said control element being arranged to be engaged by the septum, upon insertion thereof, and to be moved into a position in which the locking member coacting with the pin engages the notch thus locking the slide, said locking member returning into its disengaged position in response to a release of the pin upon withdrawal of the septum.

7. A plate or film holder of the type described, comprising in combination, a casing having slide and septum guide tracks, a septum adapted to receive a sensitized layer and slidable in said septum guide tracks, at least one slide for covering and uncovering a sensitized layer supported by the septum and slidable in said slide guide tracks, locking means including a locking member pivoted to the holder casing and arranged to extend into the path of the slide in said slide guide tracks, said slide having one corner edge shaped to cause retention of the locking member in a position extending into the slide guide tracks and a second opposite corner edge shaped to pivot the locking member into a position clearing the slide guide tracks, said first shaped edge being positioned to face the locking member when the slide is inserted in a predetermined slide face position, said second shaped edge being positioned to face the locking member when the slide is inserted in a reversed slide face position; second locking means comprising a yieldable locking member disposed within the holder casing and biased to extend into the slide guide tracks, said slide having a notch in one side edge shaped and positioned to be engaged by said second locking member upon insertion of the slide while being in said predetermined slide face position thereby locking the slide; release means for the second locking means, said release means comprising an element movably mounted on the casing and positioned to engage the second locking member for moving the same into position disengaged from the notch thereby releasing the slide for withdrawal; third locking means comprising a yieldable locking member disposed within the casing and extending into the slide guide tracks, said notch of the slide being positioned to be in registry with the third locking member upon complete insertion of the slide while being in said reversed slide face position; and second release means for the third locking member comprising an element movably mounted on the casing in engagement with the third locking member and controlled in its position by the position of the septum in the septum guide tracks, the said element being positioned to move the third locking member into engagement with said notch upon insertion of the septum thus locking the slide, and to return into a release position upon withdrawal of the septum thus releasing the slide.

8. A plate or film holder of the type described, comprising in combination a casing having septum and slide guide tracks, a septum adapted to receive a sensitized layer and slidable in said septum guide tracks, at least one slide for covering and uncovering a sensitized layer supported by the septum and slidable in said slide guide tracks, first locking means comprising a locking arm pivotally mounted in a recess within the holder casing and arranged to extend into the path of the slide in said slide guide tracks, said slide having a substantially pointed edge causing retention of the locking member in a slide blocking position in said slide guide tracks and a rounded opposite edge causing pivoting of the locking member into a position clearing the slide guide tracks, said pointed edge being positioned to face the locking member when the slide is inserted in a predetermined slide face position, said rounded edge being positioned to face the locking member when the slide is inserted in a reversed slide face position; second locking means comprising a yieldable locking member disposed within the holder casing and biased to extend into the slide guide tracks, said slide having a notch in one slide edge, shaped and positioned to be engaged by said second locking member upon insertion of the slide while being in said predetermined slide face position thereby locking the slide; release means for the second locking member, said release means comprising a pin slidably mounted in the casing, one end of the pin engaging said second locking member the other end protruding from the casing for releasing the slide in response to a depression of the pin causing disengagement of the second locking member from said notch, the protruding end of the pin being positioned to be engaged and depressed by the back of a camera into which the holder is inserted; third locking means comprising a yieldable locking member disposed within the casing adjacent to the slide guide tracks, said notch of the slide being positioned to be in alignment with the third locking member upon complete insertion of the slide in said reversed slide face position; and second release means for the third locking member comprising a control element movably mounted in the casing, one end of said control element engaging said third locking member, the other end protruding into the septum guide tracks, said control element being arranged to be engaged by the septum, upon insertion thereof, and to be moved into a position in which the third locking member coacting with the control element engages the notch, said third locking member returning into its disengaged position in response to a release of the control element upon withdrawal of the septum.

9. A plate or film holder of the type described, comprising in combination, a casing having septum and slide guide tracks, a septum adapted to receive a sensitized layer and slidable in said septum guide tracks, at least one slide for covering and uncovering a sensitized layer supported by the septum and slidable in said slide guide tracks, locking means comprising a yieldable locking member disposed within the holder casing and biased to extend into the slide guide tracks, said slide having a notch in a side edge shaped and positioned to be engaged by said locking member upon insertion of the slide while being in a predetermined slide face position thereby locking the slide, and release means for said locking member comprising a pin slidably mounted in the casing, one end of the pin engaging said locking member the other end protruding from a face side of the casing for releasing the slide in response to a depression of the pin causing disengagement of the locking member from said notch, the protruding end of said pin being positioned to be engaged and depressed by the back of a camera in which the holder is inserted.

10. A plate or film holder of the type described, comprising in combination a casing having septum and slide guide tracks parallel to each other, a septum adapted to receive a sensitized layer and slidable in said septum guide tracks, at least one slide for covering and uncovering a sensitized layer received by the septum and slidable in said slide guide tracks, locking means comprising a yieldable locking member disposed within the casing adjacent to the slide guide tracks, said slide having a notch in a side edge positioned to be in registry with said locking member upon complete insertion of the slide while being in a predetermined slide face position, and release means for said locking member comprising a control element movably mounted in the casing, one end of the control element protruding into the septum guide tracks, said control element being arranged to be engaged by the septum, upon insertion thereof, and to be moved into a position in which the locking member coacting with the control element engages the notch, said locking member returning into its disengaged position in response to a release of the control element upon withdrawal of the septum.

11. A plate or film holder as described in claim 1, wherein said casing is composed of two similarly shaped sections confining a space therein-between, a bar disposed within said space along each of two opposite sides of the casing, each of said bars including one of said guide tracks for the septum and supporting said locking members, and a frame plate between said bars and each of the adjacent casing sections to form said guide tracks for slides inserted between a frame plate and the respective casing section, each of said frame plates including in its side edges recesses for holding the said locking members in positions coacting with the slides for the purposes aforesaid.

MORRIS SCHWARTZ.
WILLIAM CASTEDELLO.

REFERENCES CITED

The following references are of record in the file of this patent:

UNITED STATES PATENTS

| Number | Name | Date |
|---|---|---|
| 273,008 | Barker | Feb. 27, 1883 |
| 484,569 | Pierce | Oct. 18, 1892 |
| 1,033,525 | Bornmann | July 23, 1912 |
| 1,954,917 | Burnell | Apr. 17, 1934 |
| 1,954,918 | Burnell et al. | Apr. 17, 1934 |
| 2,114,638 | Parker | Apr. 19, 1938 |
| 2,432,414 | Harvey | Dec. 9, 1947 |

FOREIGN PATENTS

| Number | Country | Date |
|---|---|---|
| 3,325 | Great Britain | Mar. 9, 1886 |
| 372,379 | Germany | Mar. 27, 1923 |